April 15, 1930. H. F. STEVENS 1,754,655
CONTROLLING MEANS
Filed May 26, 1925 2 Sheets-Sheet 2
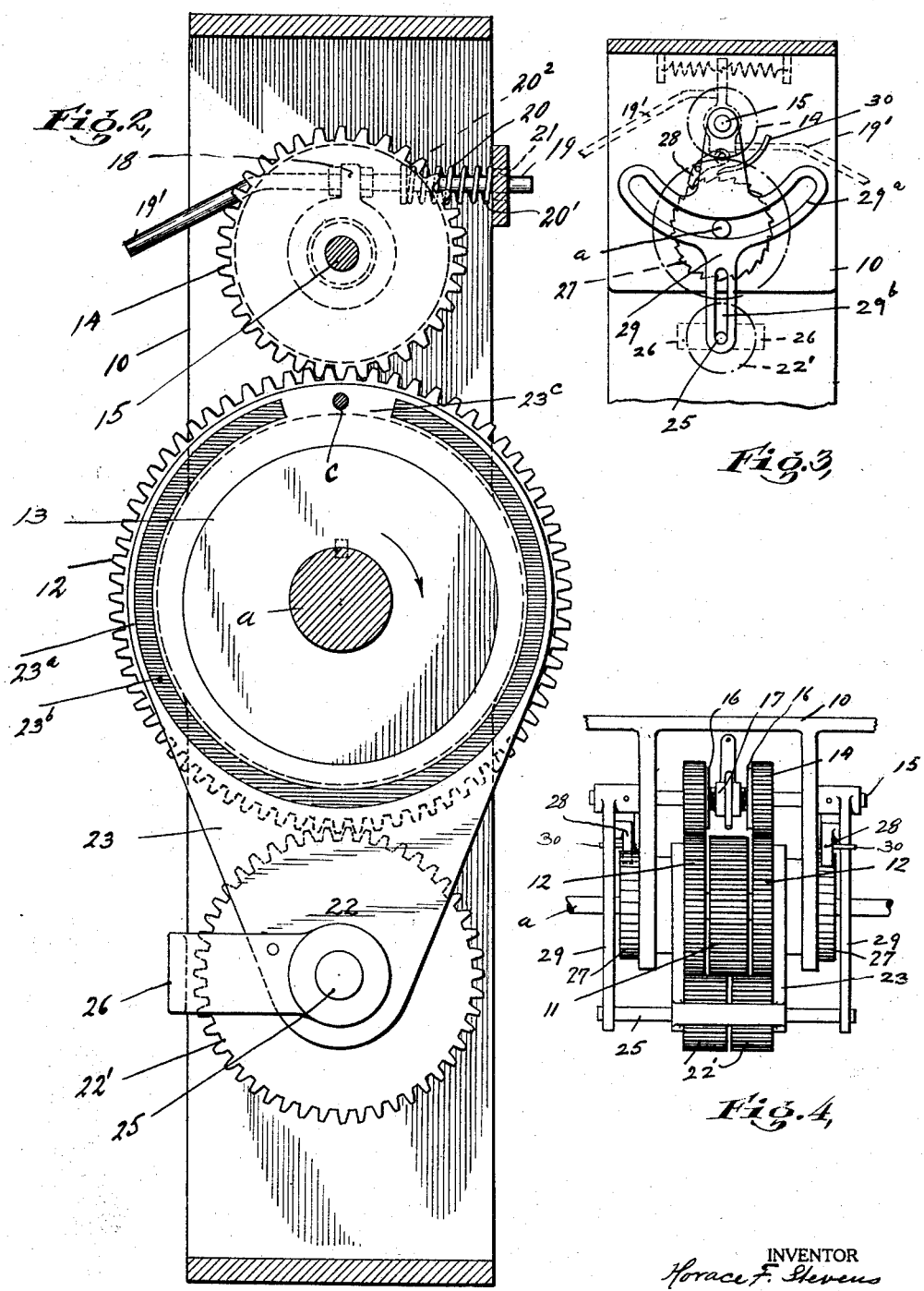

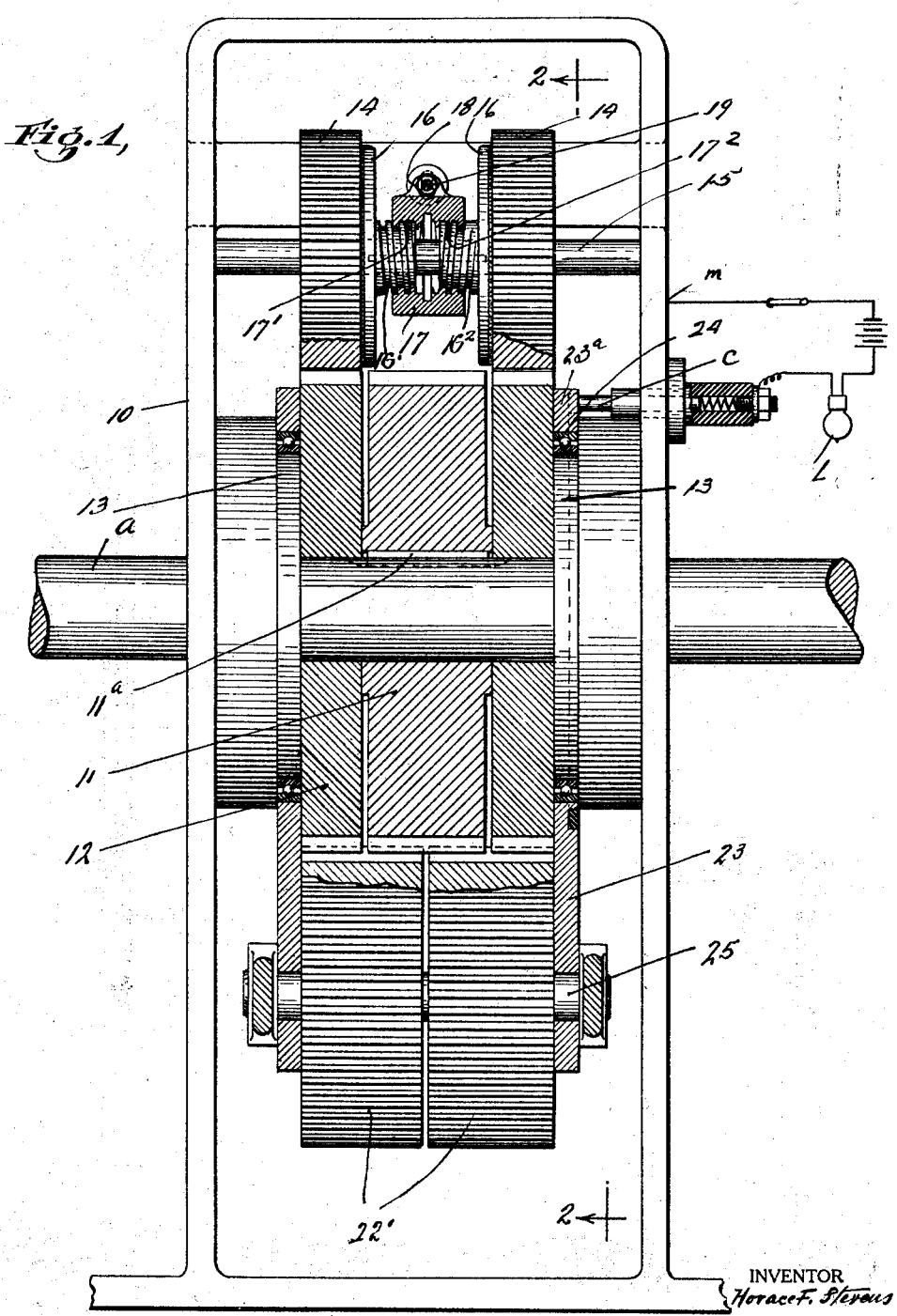

Patented Apr. 15, 1930

1,754,655

UNITED STATES PATENT OFFICE

HORACE F. STEVENS, OF KENILWORTH, NEW JERSEY

CONTROLLING MEANS

Application filed May 26, 1925. Serial No. 32,902.

This invention relates to means for controlling devices, either of mechanical or electrical nature, used in connection with a moving or travelling element.

Such devices, for instance, may be safety locks for vehicles, whereby the latter will be prevented from rolling backwards or forwards, while on a grade or hill and while the brakes either fail to function or are accidentally released. Taking another instance, these devices may be electric switches for automatically controlling the stop signals on motor vehicles.

The object of this invention is to provide an automatic control of comparatively simple construction, that can be easily and quickly applied to a vehicle or to any machine having a rotary driving element.

My invention will be understood by reference to the accompanying drawing in which similar reference characters denote corresponding parts and in which Fig. 1 is a sectional elevation of my control device shown in connection with an electric switch to be controlled thereby; Fig. 2 is a vertical section on line 2—2 of Fig. 1; Fig. 3 is an elevation on reduced scale of my device shown in connection with a locking mechanism and Fig. 4 is an elevation thereof at a right angle to that of Fig. 3.

Let $a$ denote the driven rotary element, which, for instance, in the case of a motor vehicle, may be the propeller shaft. 10 denotes a stationary metal frame or casing bearing the shaft $a$ and which may be suitably fixed in position to the frame of the vehicle. Keyed or otherwise fixed, as at 11$^a$, on the shaft $a$, preferably centrally in said frame, is a cog wheel 11, and loosely mounted on said shaft at one or each side thereof is a cog wheel 12 of the same diameter as that of the gear 11. In the present example, two loose gears 12 are used. Fixed to or formed integrally with the inner faces of the side walls of the frame, are rings or annular members 13 arranged slightly eccentrically relative to the axis of the shaft $a$. These members serve for the oscillatory suspension of a toothed member to be presently described and which constitutes the control element proper. The loose side gear or gears 12 are in constant meshing connection with a pinion or pinions 14 rotatably supported on a spindle 15 revolubly mounted in the side walls of the frame 10 to extend parallel to the driven shaft $a$. Cooperating with these pinions 14, are means adapted normally to influence the rotation of said pinions and consequently of the loose gears 12 carried by the shaft $a$. These means may be brakes or the like that normally will retard the movement of the pinions 14 and gears 12. In the present example, I provide discs 16, which are centrally splined on the spindle 15 to be displaceable longitudinally thereof and each formed centrally with an inwardly extending externally threaded sleeve, the threads on both sleeves running in opposite directions. Working on the threaded sleeves 16', 16$^2$ is a nut 17 formed correspondingly with oppositely running internal screw threads, as at 17', 17$^2$, and having on its periphery an eye 18 in which is fixed to a pin or the like 19. One end of this pin passes through a slot 21 provided in the frame 10 in which it is held against lateral displacement, but capable of swinging a very short arc in vertical direction. A spring 20 fixed to the frame 10 at one end, as at 20', and to the pin 19 at the opposite end, as at 20$^2$, has the tendency to resist the swinging of the pin and consequently the turning of the nut. The opposite end 19' of the pin 19 is bent downwardly into the path of the oscillatory member or control element 22, which will now be described.

This element 22 is carried by a substantially U-shaped frame 23, whose sides, at their upper ends, are ring-shaped, as at 23$^a$, to fit around and rotatively bear on the circumferences of the rings 13, preferably by suitable ball bearings 24. The cross piece of said frame is formed by a spindle 25. The element 22 is formed by a pinion or pinions 22', which in length may be substantially equal to the total width of the three gears 11, 12 and 12. Owing to the eccentric suspension of the members 13 carrying the U-shaped frame 23, the teeth of the pinion or pinions 22' will but partly engage the teeth of the gears 11, 12, 12, when the pendulous frame 23 is in its lowermost or normal position, and as the frame swings around its axis, to come into full mesh with said gears. This eccentric suspension is advantageous, as thereby the element 22 will be allowed to swing back into normal position with less resistance due to friction than if it were continuously in full meshing connection with the gears 11 and 12. Projecting from the frame 23, is a nose 26, which, when the pendulous frame is caused to swing around its axis, will at a certain point of its circular path be thrust against the free end of the bent part 19' of the spring actuated pin 19 and thereby give the nut 17 a short turn, as a result of which the brake discs 16, which normally, owing to the action of the spring 20, are held in frictional engagement with the sides of the pinions 14 and exert thereon a braking action, will be fed slightly away from the pinions 14 releasing the latter.

Supposing that the device requiring control is an electric switch used for controlling a signal light L of a motor vehicle. One end of the battery circuit operating the light L is grounded, say at $m$, and the opposite end thereof is connected to a spring actuated brush or conductor $c$, which is slidably guided through one of the sides of the frame 10 and adapted to constantly bear on the adjacent face of the ring-shaped end $23^a$ of the pendulous frame 23. This face may be entirely insulated, as at $23^b$, save a narrow part, as at $23^c$, which, when contacting with the brush, will close the circuit of the battery.

Now while the vehicle is at a standstill, that is, the shaft $a$ at rest, the frame 23 and element 22 will occupy the normal position. In the present embodiment, where the frame 23 is shown to be pendulously suspended, gravity will tend to bring and maintain it in the normal position shown in Figs. 1 and 2, and the exposed part $23^c$ of the frame 23 will be in contact with the brush $c$ of the battery circuit, closing the latter, so that the signal light will be on. At the same time, the loose gears 12, 12 will be under the action of the brakes 16. When the vehicle starts to run, say forwardly, the gear 11 will revolve with the shaft $a$, say clockwise, as indicated by the arrow in Fig. 2. The teeth of the pinion or pinions 22' engaging said gear 11 and simultaneously also the gears 12, 12, owing to the braking action on the pinions 14, will become clinched between the teeth of the revolving gear 11 and those of the more slowly moving gear or gears 12, as a result of which the frame 23 will be caused to swing out of its normal position in the direction of the rotation of the shaft $a$. As it swings upwardly, the teeth of the gear or gears 22' gradually enter into full mesh with those of the gears 11 and 12. The degree of eccentricity given to the suspension of the frame may be so chosen, that the point at which the teeth of the gears 22', 11 and 12 fully intermesh lies below the upper hemisphere of the gears 11, 12. Just about the time the frame 23 reaches that point, its nose 26 is thrust against the pin 19 and in the afore-described manner releases the pinions 14 and consequently the gears 12, 12. The gears 22' now will be free to turn on their own axes, i. e. on the spindle 25. As a result of the frame leaving its normal position, the brush has entered on the insulated part $23^b$ thereof and the circuit of the battery is broken. As long as the shaft $a$ continues to revolve in the same direction, the frame 23 remains raised from its normal position, the gears 22', as stated, after the release of the gears 12, merely revolving around the spindle 25. Of course, just as soon as the gears 12 are released, the element 22 will begin to move toward its normal position, i. e. away from the finger or bent part 19', permitting the nut 17 under the force of the spring 20, to move the brake discs 16 back into engagement with the gears 14 and hence again retard the gears 12, as a result of which the element 22 will again rise to actuate the finger 19' and so on. Thus as long as the spindle or shaft $a$ continues to revolve in the same direction, the frame 23 and elements 22' will hover between their uppermost and normal positions just carrying out minute vibrations in vertical direction and hence remaining out of normal position. But when the shaft $a$ comes to a full stop, the frame 23 will be allowed to instantaneously swing back into its normal position, the gears 22' thereof rolling over the gears 11, 12, in consequence of which the battery circuit becomes closed, as hereinbefore described.

To utilize my invention for the control of a locking device for a revolving element, I may construct the device as follows:

Keyed to the shaft or spindle $a$, are two ratchet wheels 27, 27, one on each side of the frame 10, with their teeth facing opposite directions. Cooperating with each wheel, is a spring actuated pawl 28 carried by an arm 29, which is suspended from the spindle 15 of the gears 14 and which is formed intermediate its ends with a circularly curved loop or recess $29^a$ through which passes the spindle $a$ and whereby it is permitted to swing on its suspension point. The lower end of each arm is longitudinally recessed, as at $29^b$ and engages in its recess one end of the spindle 25 carrying the gears 22'. Suitable means, such as a finger 30 formed on the end of a rod (not shown) operable from the driver's seat, may be provided for each pawl to release one or the other of said pawls from engagement with the corresponding ratchet wheel, according to the direction of rotation. Now when the vehicle stars running, the frame 23 and with it the spindle 25 will swing out from normal position in the aforedescribed manner. As a result thereof, the arms 29 carrying the pawls 28 will swing in the same direction. The operative pawl thereby will be swung away from engagement with its ratchet wheel and thus permit the shaft $a$ to revolve. As long as the frame 23 and element 22 hover between the uppermost position and the normal position, the operative pawl 28 remains out of engagement with the corresponding ratchet 27, but when the frame 23 returns into initial position, the operative pawl will swing back into engagement with the ratchet wheel. Since the operative pawl is held out of engagement with the ratchet during the operation of the shaft or the running of the vehicle, there will be no clicking noise. Thus with the aid of my new control ratchet and pawl may be effectively used as a safety lock for preventing retrograde movement or rolling forward as the case may be.

But, of course, the devices described as capable of being controlled by my invention are merely examples. There are numerous other cases to which my invention can be effectively applied as a controlling device, and I do not wish to restrict myself in this respect in any way.

Also the control device itself may be modified in various ways without departing from the principle underlying my invention and I wish, therefore, to be expressly understood that I do not restrict myself to any details of the construction described and shown.

What I claim is:—

1. In an automatic control of the character described, the combination with a driven rotary element, of a pendulously suspended toothed rotary element, a gear on and revolving with said driven element, at least one other gear loose on said driven element, said pendulously suspended element being adapted to engage both said gears, means influencing the rotation of said loose gear, so as to cause said pendulously supported element to oscillate and be retained out of its normal position, while said driven element is rotating, and including means cooperating with said pendulously suspended element for actuating said first named means, said pendulously supported element returning to its initial position after the rotation of said driven element ceases.

2. In a control device of the character described, the combination with a driven rotary element, of a gear on and revolving with said driven element, at least one other gear loose on said driven element, means influencing the speed of rotation of said loose gear, a pendulous toothed element eccentrically suspended relative to the axis of said driven element and capable of revolving upon itself, said element being adapted to be constantly in engagement with said gears, so that when said driven element revolves in a certain direction, said toothed element will be oscillated and gradually come into full mesh with said two gears and means on said pendulous element to cooperate with said first named means, when out of its normal position, to release said loose gear, so that said toothed element will be retained out of its normal position during the rotation of the driven element and when said rotation ceases will instantaneously swing back to normal position.

3. The combination with a driven rotary element, of an automatically controlled safety lock therefor, comprising an oscillatory element adapted to be swung and retained out of its normal position, when said rotary element revolves, and to return by gravity into its normal position, when said rotary element comes to a full stop, means operatively connected to said rotary element and means operatively connected to said oscillatory element and capable of interlocking with said first named means to lock said rotary element, when the latter is stopped.

4. In an automatic control of the character described the combination with a driven rotary element, of a pendulously suspended rotary element, means fixed to and revolving with said driven element, rotary means loose on said driven element, said pendulously suspended element being adapted to engage both said fixed means and said loose means, means influencing the rotation of said loose means so as to cause said pendulously supported element to oscillate and be retained out of its normal position while said driven element is rotating and including spring actuated means cooperating with said pendulously supported element for actuating said third named means, said pendulously suspended element returning to its initial position after the rotation of said driven element ceases.

5. In an automatic control of the character described the combination with a driven spindle, of a fixed gear thereon, a loose gear thereon, a pendulously suspended element, freely revolving toothed means carried by said element and capable of engaging both said gears, means influencing the rotation of said loose gear so as to cause said pendulously supported element to oscillate and be retained out of its normal position while said driven spindle is rotating and including means carried by said pendulously suspended element for actuating said second named means, said pendulously suspended element returning to its initial position after the rotation of said driven spindle ceases.

6. In a device as per claim 1 in which the means influencing the rotation of said loose gear includes braking means.

7. In a device as per claim 4, in which the means for influencing the rotation of said loose means includes braking means.

8. In a device as per claim 5, in which the means influencing the rotation of said loose gear includes braking means.

In testimony whereof I affix my signature.

HORACE F. STEVENS.